Patented Dec. 9, 1930

1,784,618

UNITED STATES PATENT OFFICE

JOHN H. BARRINGTON, OF BALTIMORE, MARYLAND, ASSIGNOR, BY MESNE ASSIGNMENTS, TO STANDARD BRANDS INCORPORATED, OF DOVER, DELAWARE, A CORPORATION OF DELAWARE

YEAST MANUFACTURE

No Drawing. Application filed November 16, 1923, Serial No. 675,204. Renewed April 29, 1930.

This invention relates to yeast manufacture and has among its objects production of a higher quality of yeast, more efficient control of various steps in yeast manufacture and more efficient and economical manufacture than the processes heretofore known. The various advantages of this invention will clearly appear from the following description.

A mash composed of the usual grain extracts, and an admixture of molasses, preferably beet molasses, is prepared by souring for the subsequent step of yeast propagation, the molasses comprising at least sixty per cent. of the mash. The extracts of the grain supply substantial quantities of organic nitrogen and physiological salts while the molasses contains, among other matters, sugars, potassium salts and nitrogen. The souring of this combined grain and molasses mash, by inoculation with a lactic acid culture, results in formation of lactic acid, which tends to neutralize the natural alkaline tendency of molasses, there resulting the formation of organic salts or lactates. The souring should preferably be carried on sufficiently long to form a substantial excess of lactic acid in order that the entire mash when diluted in the process of yeast propagation should carry sufficient lactic acidity for fermentation. Preferably the acidity should range from that acidity which will require from 2 c. c. to 5 c. c. of a tenth normal soda solution to neutralize 40 c. c. of fermenting wort.

As lactic acid is weakly ionizable, the hydrogen ion concentration of the fermenting liquid can be more efficiently controlled than when inorganic acids are used. Souring of the combined grain and molasses mash also facilitates the breaking down of complex proteins of the grain and the molasses into simpler compounds, such as peptones and amino acids, thus releasing substantial quantities of nitrogen. In this way the mash is enriched with buffering materials which are especially important where ammonium sulfate is used for the purpose of supplying some of the required nitrogen. It has been the practice when grain is used in yeast manufacture to run the filtered wort, after cooling, directly to the fermenters. The long, drawn-out filtering often causes infection, making it practically impossible to grow pure yeast in an open fermenter. In this process, after the grain and molasses mash has been soured and filtered, it is then transferred to a container where it is kept at a sterilizing temperature, such as 65° C. From the container the wort is transferred in the manner hereinafter disclosed directly to the fermenters.

Fermentation is commenced with a low gravity wort as for example 1.5° Balling prepared, for example, by diluting a portion of the previously prepared and relatively concentrated wort and the quantity of seed yeast preferably used is approximately 8% of the total raw materials. After fermentation has progressed so that the yeast has consumed substantial quantities of the yeast nutrients in the wort and thereby reduced the Balling per cent., the wort of a heavier gravity is added. This wort should be kept hot, up to and including the time of feeding into the fermenter, thereby preventing infection of storage supplies. The rate of feeding of the additional wort may be regulated in accordance with the growth requirements of the yeast.

For the purpose of controlling the acidity and hydrogen ion content of the mash, either aqua ammonia or ammonium sulfate or preferably both are added. The aqua ammonia is added preferably during the first part of fermentation, to counteract the increasing acid tendency of the mash. Ammonium sulfate is added as the acidity of the fermenting mash commences to decrease, the acid radical counteracting the alkaline tendency of the mash. Ammonium phosphate is introduced in the wort in the fermenter at the beginning of fermentation, the ammonium phosphate, aqua ammonia and ammonium sulfate, inorganic salts, constituting from five per cent. to ten per cent., and preferably about seven per cent., of the total weight of raw materials.

As the wort described herein contains a large quantity of organic acid and organic salts it tends to become alkaline particularly during the later stages of the propagation and as the ammonium sulfate added during the propagating period is partially assimilated by the yeast whereby acid radicals are released, there is no necessity of adding inorganic acid to the fermenter before fermentation as the lactic acid formed in souring is sufficient, the result being a much more satisfactory acidity control.

The lactic-acidification of the mash prior to propagation of yeast therein also causes a more complete release of nitrogen into a form assimilable by yeast and which thereby reduces the amount of inorganic salts required. After fermentation has commenced the wort is preferably slightly acid, for example from 0.1° to 0.4°, on the scale above mentioned as usually determined by litmus.

I have found that very beneficial results are obtained by commencing to feed the heavier gravity wort with the fermenting mash when the Balling per cent. substantially decreases, the amount fed in per hour increasing until the termination of the feeding in.

Having described my invention, what I claim as new and desire to secure by Letters Patent, is:

1. In a process of manufacturing yeast by propagating yeast in a nutrient solution of a composition such that during the later stages of the propagating period there is a tendency toward decreasing acidity, the improvement comprising the step of maintaining a substantially constant acidity by adding ammonium sulphate to the propagating liquid during the said later stages.

2. In a process of manufacturing yeast by propogating yeast in a nutrient solution of a composition such that during the first stages of the propagating period there is a tendency toward increasing acidity and in the later stages a tendency toward decreasing acidity, the improvement comprising the steps of maintaining a substantially constant acidity during a substantial portion of the propagation by adding aqua ammonia during the first of said stages and adding ammonium sulphate during the latter of said stages.

3. In a process of manufacturing yeast by propagating yeast in a nutrient solution of a composition such that during the first stages of the propagating period there is a tendency toward increasing acidity and in the later stages a tendency toward decreasing acidity, the improvement comprising the steps of maintaining a substantially constant acidity during a substantial portion of the propagation by adding an antacid substance innocuous to yeast and containing yeast assimilable nitrogen during the first of said stages and adding an inorganic ammonium salt during the latter of said stages.

4. A process of manufacturing yeast which comprises preparing a yeast nutrient solution including cereal material, molasses and yeast nutrient inorganic salts including a salt adapted to supply nitrogen to the yeast and to release acid components during the propagation, which comprises souring the solution during mashing, filtering, diluting a portion of the solution, initiating the propagation of yeast in the diluted portion and thereafter adding the remainder of the nutrient solution in accordance with the continued growth requirements of the yeast, and during a substantial portion of the propagating period maintaining a substantially constant acidity in the propagating liquid by addition of aqua ammonia and ammonium sulphate.

5. A process of manufacturing yeast by propagating yeast in a nutrient solution of a composition such that during the propagating period there is a tendency toward decreasing acidity, the improvement comprising adding a yeast-nutrient ammonium salt of an inorganic acid to the progagating liquid during the propagating period in such amounts and at such times as to maintain in the propagating liquid an acidity above that at which infection thereof will occur, but below that which materially inhibits the growth of the yeast.

6. A process of manufacturing yeast by propagating yeast in a nutrient solution of a composition such that during the propagating period there is a tendency toward decreasing acidity, the improvement comprising adding ammonium sulphate to the propagating liquid during the propagating period in such amounts and at such times as to maintain in the propagating liquid an acidity above that at which infection thereof will occur, but below that which materially inhibits the growth of the yeast.

7. A process of manufacturing yeast, which includes using as mash materials both molasses and grain; during the mashing souring at least a portion of the mash materials with lactic-acid-forming bacteria until a substantial excess of lactic acid is obtained; propagating the yeast with aeration in an extract obtained from the mash materials; adding a yeast-nutrient ammonium salt of an inorganic acid to the propagating liquid during the propagating period in such amounts and at such times as to maintain in the progagating liquid an acidity above that at which infection thereof will occur, but below that which materially inhibits the growth of the yeast.

8. A process of manufacturing yeast, which includes using as mash materials both molasses and grain; during the mashing souring the mash materials with lactic-acid-forming bacteria until a substantial excess of lactic acid is obtained; propagating the yeast with aeration in an extract obtained from the mash materials; adding ammonium sulphate to the propagating liquid during the propagating period in such amounts and at such times as to maintain in the propagating liquid an acidity above that at which infection thereof will occur, but below that which materially inhibits the growth of the yeast.

9. A process of manufacturing yeast, which includes using as mash materials both molasses and grain, of which the molasses comprises about 60% of the total weight; during the mashing souring the mash materials with lactic-acid-forming bacteria until a substantial excess of lactic acid is obtained; propagating the yeast with aeration in an extract obtained from the mash materials; adding ammonium sulphate to the propagating liquid during the propagating period in such amounts and at such times as to maintain in the propagating liquid an acidity above that at which infection thereof will occur, but below that which materially inhibits the growth of the yeast.

10. A process of manufacturing yeast, which includes using as mash materials both molasses and grain; during the mashing souring at least a portion of the mash materials with lactic-acid-forming bacteria until a substantial excess of lactic acid is obtained; propagating the yeast with aeration in a diluted portion of an extract obtained from the mash materials; adding a yeast-nutrient ammonium salt of an inorganic acid to the propagating liquid during the propagating period in such amounts and at such times as to maintain in the propagating liquid an acidity above that at which infection thereof will occur, but below that which materially inhibits the growth of the yeast, and slowly adding the remainder of the extract from the mash materials.

11. A process of manufacturing yeast, which includes using as mash materials both molasses and grain; during the mashing souring at least a portion of the mash materials with lactic-acid-forming bacteria until a substantial excess of lactic acid is obtained; propagating the yeast with aeration in a diluted portion of an extract obtained from the mash materials; adding a yeast-nutrient ammonium salt of an inorganic acid to the propagating liquid during the propagating period in such amounts and at such times as to maintain in the propagating liquid an acidity above that at which infection thereof will occur, but below that which materially inhibits the growth of the yeast, and slowly adding the remainder of the extract from the mash materials; the total amount of yeast-nutrient ammonium salts used comprising up to about 8% of the mash materials.

JOHN H. BARRINGTON.